No. 612,476. Patented Oct. 18, 1898.
J. L. ATWATER.
PHOTOGRAPHIC SHUTTER.
(Application filed Dec. 2, 1897.)

(No Model.)

Fig. I.

WITNESSES:
Lew. E. Curtis
A. W. Munday

INVENTOR:
JOHN L. ATWATER
BY Munday, Evarts & Adcock,
HIS ATTORNEYS.

THE NORRIS PETERS CO., PHOTO-LITHO., WASHINGTON, D. C.

UNITED STATES PATENT OFFICE.

JOHN L. ATWATER, OF WESTERN SPRINGS, ILLINOIS, ASSIGNOR TO THE VIVE CAMERA COMPANY, OF CHICAGO, ILLINOIS.

PHOTOGRAPHIC SHUTTER.

SPECIFICATION forming part of Letters Patent No. 612,476, dated October 18, 1898.

Application filed December 2, 1897. Serial No. 660,474. (No model.)

*To all whom it may concern:*

Be it known that I, JOHN L. ATWATER, a citizen of the United States, residing in Western Springs, in the county of Cook and State of Illinois, have invented a new and useful Improvement in Camera-Shutters and Mechanism for Operating the Same, of which the following is a specification.

My invention relates to photographic cameras, and more particularly to the shutter and mechanism for operating it.

The object of my invention is to provide a camera with a shutter and a shutter-operating mechanism of a simple and durable construction which may be manufactured at small cost and conveniently and easily operated to make either instantaneous or time exposures, as may be required.

My invention consists in the novel devices and novel combinations of parts and devices herein shown and described, and more particularly set forth in the claims.

Figure 3:
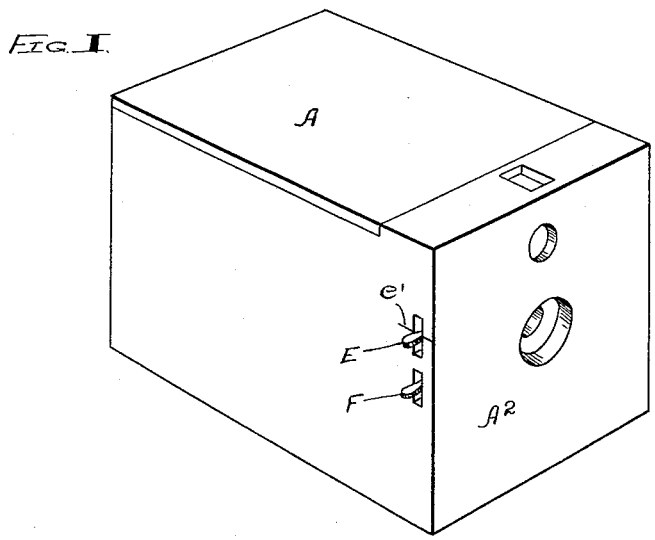
Figure 2:
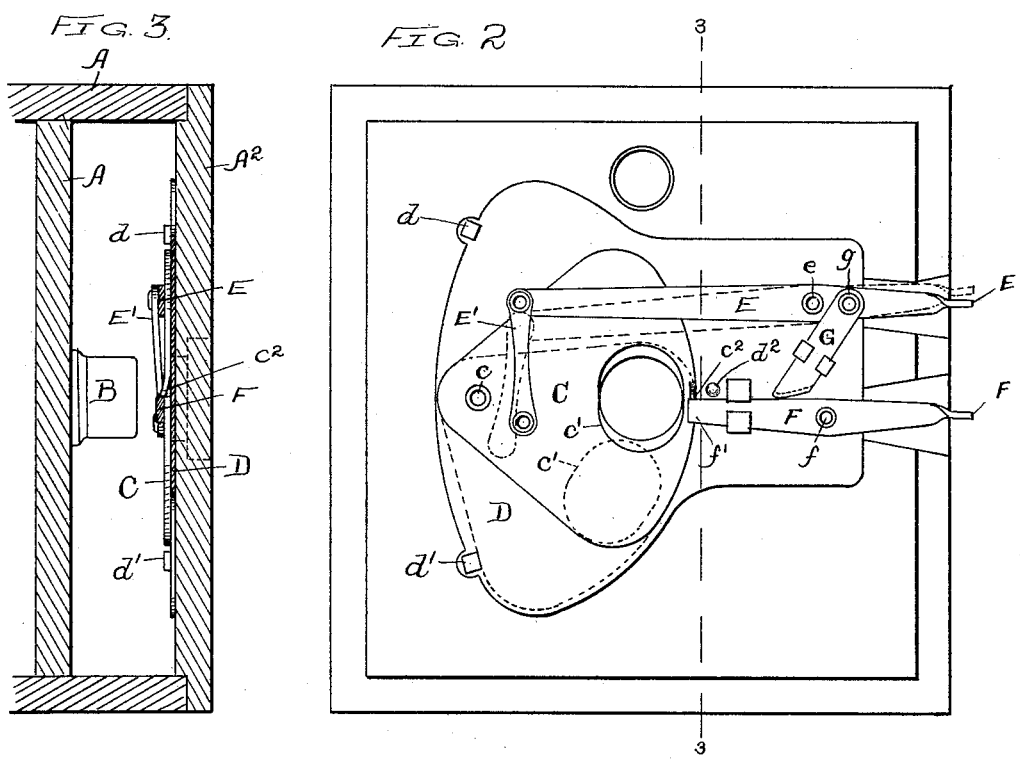

In the accompanying drawings, which form a part of this specification, and in which similar letters of reference indicate like parts in the several views, Figure 1 is a perspective view of the camera provided with my improved shutter. Fig. 2 is an elevation showing the inner side of the camera-front and the shutter and its operating mechanism secured to said front, and Fig. 3 is a vertical section on the line 3 3 of Fig. 2.

In said drawings, A represents the camera case or box; A', its vertical partition, in which the lens-tube B is mounted, and $A^2$ the front of the case, in or on which the shutter and its operating mechanism are mounted.

The shutter (shown at C) is preferably of a sector shape and pivoted, preferably, at its smaller end at $c$ to a bed or frame plate D, on which all of the parts of the shutter and its mechanism are preferably mounted, and which plate in turn is mounted by suitable fastenings upon the inner face of the camera-front $A^2$. The object of mounting the shutter and its operating parts upon this frame-plate D rather than upon the wooden end $A^3$ of the box is to make the apparatus more readily removable from the camera and more readily applicable thereto, as well as to facilitate the manufacture and adjustment of the shutter and to render the ordinary service of a bed-plate in keeping the parts of the mechanism in proper relation to each other. The shutter C at its larger end is provided with a centrally-located and preferably somewhat elongated opening $c'$, through which the exposure is made.

E is a lever with its fulcrum at $e$. The shorter arm of this lever projects out to the exterior of the camera-box, while the long arm is pivotally connected by the bar E' to the shutter-sector C at a point in proximity to the pivot $c$. By this arrangement and combination of parts a slight movement of the outer or short end of the lever E by the thumb of the operator will cause the shutter to swing rapidly past the lens and against one or the other of the stops $d\ d'$, which may be faced with some yielding material to avoid a clicking sound and hammering action. As no appreciable power is required, this lever can readily be worked by the finger or thumb of the operator, who can move it either quickly or slowly, and thus control, to a considerable extent, the nature of the exposure to make the same either instantaneous or something less than that, measuring the amount of time by guessing at it. Where still longer exposures are desired and the lens is to be kept open for a considerable period, as in time exposures, another manner of manipulation, to be presently described, is employed; but it will be found that the above-mentioned capacity for variation of the instantaneous from a very quick continuous movement of the shutter to a very slow one without the necessity of changing the mechanism in any manner is a great convenience to the photographer, who will soon acquire the knack of adjusting the exposure to suit the conditions. Moreover, as the motion required to be given to the exterior end of the lever by the thumb is a motion practically in the plane of the side of the camera-box the effort to move said lever the short distance required is not at all likely to cause any movement of the camera-box itself so as to blur the picture.

It will be noticed that as the lever E projects out to the side of the camera-box, as the same is illustrated in the drawings, its motion is up and down—that is to say, in two directions—and I find it to be somewhat inconvenient to make these two motions in different directions with the thumb of the same hand without changing the position of this hand in the holding of the box at the time of the exposure. It is much better that the motion of the thumb should be always in a downward direction or toward the fingers of the hand which grasp the box, and thus afford a steady purchase. For this and other reasons I provide a second lever F with a fulcrum at $f$, placed just beneath or in proximity to the lever E, and I connect the levers E and F together by the bar G, pivoted at $g$ to the lever E at the outer side of its fulcrum and bearing against the lever F at the inner side of the latter's fulcrum. By this arrangement it will be seen that the bar E may be moved in the two directions by a downward pull applied to the lever E in one case and to the lever F in the other case. Thus if the shutter stands closed at its lowermost position, pressing against the stop $d'$, it may be shot past the lens into its uppermost position against the stop $d$ by a downward motion of the thumb against the extremity of the lever E, and, on the other hand, if the shutter stands closed in its upper position against the stop $d$ it may be shot past the lens in the opposite direction by a downward motion of the thumb against the outer extremity of the lever F, which, acting upon the bar G, lifts the outer extremity of the lever E, and thus throws down the inner end of said lever and shoots the shutter downward, as will be readily understood, and it will be seen also in this connection that whichever of the levers E or F is moved downward this act will set the outer end of the other lever up ready to be moved in turn, so that the apparatus is self-setting, and the photographer, in order to shoot the shutter past the lens, has only to press down the outer extremity of whichever lever E or F happens at the time to be in the raised position, so that no confusion can ever arise, for he has only to remember that to make an exposure he must press down upon whichever one of the two projecting lever ends he finds in the raised position, and, moreover, it is further impossible to make a mistake in this respect, because it is only the elevated one of the two which can be moved in a downward direction.

To provide for time exposures and also to produce a friction upon the shutter, the inner end $f'$ of the lever F is carried far enough to overlap the edge of the shutter C, against the face of which it bears with a slight pressure, and the edge of said shutter is provided with a raised stop $c^2$, which may bear against the upper edge of the end $f'$ of said lever F when the outer end of the latter is in its raised position, and when said stop is thus against the lever the shutter will stand open, as shown in full lines in Fig. 2. As this stop would otherwise interfere with the shooting of the shutter by means of the lever F, as above described, I provide a projection $d^2$ of a rounded or cam-like nature on the bedplate D, so that when the outer end of said lever F is depressed to shoot the shutter, its inner end being thereby raised, will ride upon this cam projection $d^2$ and thus be lifted away from the shutter, so that the stop $c^2$ may pass under the lever freely and thus not come into play; but when the outer end of the lever F is in its raised position and the outer end of the lever E is in its depressed position it is possible to set the shutter open by simply raising the outer end of the lever E as far as it can be lifted, which will move the shutter down until the stop $c^2$ comes in contact with the upper edge of the end $f'$ of the lever F, as shown in full lines in Fig. 2, and a mark $e'$ (see Fig. 1) is made on the exterior of the camera-box to indicate this position of the lever E to the eye of the photographer in order that he may know that the shutter stands open, and when in this open or central position the shutter may be closed by pressing down upon either the lever E or lever F, as will be readily understood. Although I have provided the mark $e'$ on the exterior of the box to indicate this position to the eye, it will be obvious from the above description that the shutter may be thus set at the open or central position in the dark, which is a great convenience in flash-light exposures, because when the outer end of the lever E is in the depressed position and the thumb is applied to its end it can only be raised as far as this mark, for the reason that the stop $c^2$ on the shutter will then engage the end $f'$ of the lever F.

The camera provided with this shutter and its operating mechanism, it will be noticed, is (except when specially set for time exposures, as above described) always closed to the light, except when the opening in the shutter is passing the lens—that is to say, the shutter when operated passes from a first closed position to a second closed position, and when operated the next time passes from the second closed position back to the first closed position. Consequently no plug, slide, or other separate closing device for shutting off light while the shutter is being set is necessary in this camera, as the mere act of operating the shutter closes it and sets it for the next operation.

The whole apparatus, although somewhat difficult to describe, is exceedingly cheap and simple in construction, easily manufactured, easily applied to the camera, and its use free from confusion to the operator and easily learned, and such use capable of a wide variation in the nature of the exposures made, from an exceedingly swift instantaneous exposure to a slow movement of the opening past the lens and from that to a time exposure of any duration. Moreover, the structure is entirely free from springs and parts which are liable to change or get out of order by use.

I claim—

1. The combination with the pivoted shutter having a light-opening through the same, of the lever E and its fulcrum, having its short arm extended to the exterior of the camera-box and having its long arm connected by a pivoted bar to the shutter at a point in proximity to the pivot of the latter, the lever F and the bar G connecting said two levers E and F, substantially as specified.

2. The combination with the pivoted shutter having a light-opening through the same, of the lever E and its fulcrum, having its short arm extended to the exterior of the camera-box and having its long arm connected by a pivoted bar to the shutter at a point in proximity to the pivot of the latter, the lever F and bar G connecting said two levers E and F, and stops $d\ d'$, substantially as specified.

3. The combination with the pivoted shutter having a light-opening through the same, of the lever E and its fulcrum, having its short arm extended to the exterior of the camera-box and having its long arm connected by a pivoted bar to the shutter at a point in proximity to the pivot of the latter, the lever F and the bar G connecting said two levers E and F, the inner end of the lever F overlapping the edge of the shutter and creating a frictional pressure thereon, substantially as specified.

4. The combination with the pivoted shutter having a light-opening through the same, of the lever E and its fulcrum, having its short arm extended to the exterior of the camera-box and having its long arm connected by a pivoted bar to the shutter at a point in proximity to the pivot of the latter, the lever F and the bar G connecting said two levers E and F, the inner end of the lever F overlapping the edge of the shutter and creating a frictional pressure thereon, the edge of the shutter being provided with a projection to encounter the end of said lever F, and a cam or lifting projection $d^2$ being provided for clearing said end from said stop projection when the lever F is operated, substantially as specified.

JOHN L. ATWATER.

Witnesses:
H. M. MUNDAY,
LEW E. CURTIS.